United States Patent
Alten et al.

(10) Patent No.: US 8,939,838 B2
(45) Date of Patent: Jan. 27, 2015

(54) ACCESSORY FOR PLAYING GAMES WITH A PORTABLE ELECTRONIC DEVICE

(75) Inventors: Brett Gregory Alten, Cupertino, CA (US); Sanjay Sadanand Gadkari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1394 days.

(21) Appl. No.: 12/242,221

(22) Filed: Sep. 30, 2008

(65) Prior Publication Data

US 2010/0081505 A1    Apr. 1, 2010

(51) Int. Cl.
| | | |
|---|---|---|
| A63F 9/24 | (2006.01) |
| A63F 13/20 | (2014.01) |
| G06F 17/00 | (2006.01) |
| A63F 13/90 | (2014.01) |
| A63F 13/98 | (2014.01) |

(52) U.S. Cl.
CPC ............... *A63F 13/08* (2013.01); *A63F 13/02* (2013.01); *A63F 2300/1025* (2013.01); *A63F 2300/1031* (2013.01); *A63F 2300/1043* (2013.01); *A63F 2300/1075* (2013.01); *A63F 2300/204* (2013.01)
USPC .............................................. 463/37; 463/36

(58) Field of Classification Search
USPC ................ 273/148 R–148 B; 463/36–37
See application file for complete search history.

(56) References Cited

U.S. PATENT DOCUMENTS

| | | | | |
|---|---|---|---|---|
| RE34,161 E | * | 1/1993 | Nakagawa et al. ............. | 463/29 |
| 6,786,826 B2 | * | 9/2004 | Himoto et al. .................. | 463/43 |
| 7,316,618 B2 | * | 1/2008 | Hsu ................................. | 463/37 |
| 2005/0078086 A1 | * | 4/2005 | Grams et al. ................... | 345/158 |
| 2006/0279039 A1 | * | 12/2006 | Krieger et al. ............. | 273/148 B |
| 2007/0021210 A1 | * | 1/2007 | Tachibana ........................ | 463/37 |
| 2007/0066394 A1 | * | 3/2007 | Ikeda et al. ..................... | 463/37 |
| 2007/0197291 A1 | * | 8/2007 | Shimizu et al. ................. | 463/36 |
| 2008/0287189 A1 | * | 11/2008 | Rabin ............................. | 463/36 |
| 2009/0170598 A1 | * | 7/2009 | Oberg et al. .................... | 463/31 |

OTHER PUBLICATIONS

Bozon, "Mario Kart Wii Review", Apr. 20, 2008, IGN.com, available at <http://wii.ign.com/articles/868/868012p1.html>.*
Topolsky, Joshua, "iPhone getting game thanks to the iControlpad", May 23, 2008, endgadget.com.*
Lu, Mat, "iControlPad for iPhone", May 24, 2008, TUAW.com.*
"Development Blog", Sep. 5, 2008, iControlpad.com, available at web.archive.org.*

(Continued)

*Primary Examiner* — Werner Garner
(74) *Attorney, Agent, or Firm* — Kilpatrick Townsend & Stockton LLP

(57) ABSTRACT

Circuits, methods, and apparatus that provide user interfaces for playing games on portable electronic devices. One example provides a game accessory having input controls for playing video, audio, and other types of games. The game accessory can have input controls, such as buttons, joysticks, and D-pads. Another example provides a game accessory having a thumb pad or keyboard. Other possible features include microphones, cameras and camera lenses, speakers, a second screen, rumble, and motion detection. The game accessory may have a recess sized to fit the portable electronic device. Inserts or removable adapters can be used to fit portable electronic devices having different sizes. The portable electronic device can be held in the accessory using sliding covers, clips, or other engaging members. In other examples, the accessory can communicate with another accessory for head-to-head game play. The accessory may include circuitry for power, identification, and authorization.

13 Claims, 14 Drawing Sheets

Portable electronic device can fit in game accessory for landscape use.

(56) References Cited

OTHER PUBLICATIONS

FT.com, "Phone module transformed by a jacket," [online], [retrieved on Jun. 15, 2009]. Retrieved from the Internet <URL: http://www.ft.com/cms/s/0/3a88c136-db68-11dc-9fdd-0000779fd2ac.html>, 1 page.

Miler, "MWCo8:The modu unleashes you from a single phone form factor," The Mobile Gadgeteer, Feb. 14, 2008, [online], [retrieved on Jun. 15, 2009]. Retrieved from the Internet <URL: http://blogs.zdnet.com/mobile-gadgeteer/?p=884>, 4 pages.

Modu Press Release, Jul. 2, 2008, "modu rewrites the mobile landscape with world's first modular phone," Feb. 7, 2008, Kfar-Saba, Israel, [online], [retrieved on Jun. 15, 2009]. Retrieved from the Internet <URL: http://www.modumobile.com>, 5 pages.

Modu Press Release, Dec. 12, 2008, "modu announces widespread industry support for the world's first modular mobile phone," Feb. 12, 2008, Kfar-Saba, Israel and Mobile World Congress, Barcelona, Spain, [online], [retrieved on Jun. 15, 2009]. Retrieved from the Internet < URL: http://www.modumobile.com>, 3 pages.

\* cited by examiner

Portable electronic device can fit in game accessory for landscape use.

Portable electronic device can fit in game accessory for portrait use.

Game accessory can include speakers, rumble, movement sensors, and camera lens. Speaker and microphone can provide phone features of portable media player when portable electronic device is in accessory.

Game accessory can have second screen.
Second screen can be second portable electronic device.

Portable electronic device and accessory can communicate wirelessly with home theater or audio system and television or monitor.

ACCESSORY FOR PLAYING GAMES WITH A PORTABLE ELECTRONIC DEVICE

BACKGROUND

Portable electronic devices have become ubiquitous over the past several years. It is now common for people to grab their portable media player, cell phone, laptop, and other such devices on the way out the door in the morning. The reasons for this popularity include the ever-increasing amount of functionality that Apple Inc., of Cupertino, Calif., is packing into their lines of iPods, iPhones, and related devices.

This functionality includes the original reason for their proliferation: music playback. But these devices have moved far beyond that, adding other types of media playback and other functionality. Recording has been added; some of these devices can now take pictures. Connectivity has been added; users can surf the web and navigate their way around an unfamiliar town. These devices have been a boon to the workplace as well, allowing people to read documents and read and send email messages. Of particular importance here, games can be played on them.

While the functionality of these devices has increased, their size has decreased. To achieve this size reduction, the user interface to these devices has been made very efficient. For example, some devices feature a front surface that is nearly filled with a touchscreen. The touchscreen provides almost the entirety of the user interface; it is used to display images and it is used to receive tactile command and data inputs from a user. That is, the device displays an image, the user touches, drags, taps, or otherwise touches the touchscreen, and the device interprets the touches as commands or data input. Other devices include a clickwheel that can be used to receive these tactile commands.

Unfortunately, while playing games can be fun on these portable electronic devices, it can also be somewhat awkward, particularly on a portable electronic device having a touchscreen. The same screen used for viewing an avatar's activities is used to control the avatar. This arrangement causes the user's fingers block the action. Thus, while these portable electronic devices include a highly efficient interface, when playing games it is often desirable to have a more specialized user interface.

SUMMARY

Accordingly, embodiments of the present invention provide circuits, methods, and apparatus that provide user interfaces for playing games with portable electronic devices. These user interfaces can improve a user's experience with these portable electronic devices while playing games.

An exemplary embodiment of the present invention provides an accessory having input controls for playing video, audio, and other types of games. In one embodiment of the present invention, a portable electronic device physically attaches to the accessory. The accessory can have input controls, such as buttons, joysticks, and directional pads (D-pads). In this way, the screen on the portable electronic device only functions as a screen. The user's fingers stay off the screen and thus do not block the user's view when playing a game.

Another exemplary embodiment of the present invention provides an accessory for playing audio based games. These games may provide a response that is audio based and does not use a video screen. These games may be of particular use when a user should not be visually distracted. Voice commands may used to play the game, or inputs may be received using input controls such as buttons, joysticks, or D-pads.

Another exemplary embodiment of the present invention provides game accessories having other features. These features can include cameras and camera lenses. The accessory can include a second screen, which may be a touch or conventional screen. To enhance game playing and other applications, rumble (circuits and mechanical mechanism to vibrate the accessory) and motion detection circuitry can be included. In some embodiments, the portable electronic device can be or can include a phone function. In order to allow use of the phone while the portable electronic device is in a game accessory, among other reasons, the accessory can include a microphone and speaker.

In various embodiments of the present invention, the portable electronic device can be a media player with a touchscreen, clickwheel, or other input device. The portable electronic device can physically attach to, be physically received by, or mount to an accessory. For example, the accessory may have a recess sized to fit the portable electronic device. Inserts or removable adapters can be used to fit portable electronic devices having different sizes. Also, since game play can become a bit dynamic under certain situations, the portable electronic device can be held in the accessory using sliding covers, clips, such as elastomeric clips, or other engaging members.

In a specific embodiment of the present invention, a receptacle on the portable electronic device is mated with an insert on an accessory. The portable electronic device can then be rotated into place. When in place, the portable electronic device can be flush with a surface of the accessory. The connection between the receptacle and the insert thus forms a connection for transferring power and data between the portable electronic device and the accessory. In other embodiments of the present invention, data may be transferred between the portable electronic device and the accessory wirelessly. In still other embodiments of the present invention, reactive coupling may be used to transfer data and power between a game accessory and a portable electronic device. The reactive coupling may be inductive or capacitive.

In various embodiments of the present invention, a portable electronic device and a game accessory can wirelessly communicate with other devices. For example, a portable electronic device and accessory can communicate with another portable electronic device and accessory for head-to-head game play. This communication can be either direct or indirect, as through the Internet. In these and other situations, further communication can be had with a television, monitor, home theater, or other such device. For example, some information can be displayed on the portable electronic device. Other information can be displayed on a television. This allows some information to be displayed privately to a user, while other information is displayed to the user and the user's opponent. In other embodiments, communication can be between a portable electronic device and an accessory and a home stereo or home theater.

In various embodiments of the present invention, a game accessory includes circuitry for providing identification information. This information may pertain to the capabilities of the accessory. For example, the accessory may inform the portable electronic device that it has a second screen, speakers, or other functionality. The accessory may include further circuitry for receiving information from the portable electronic device. For example, the accessory may inform the accessory that it has a certain sized screen, video capability, or other functionality.

In various embodiments of the present invention, a game accessory includes circuitry for providing authentication. That is, the portable electronic device may ensure that an accessory is authentic before beginning or continuing to operate with the accessory. The accessory may also include a battery, which may be chargeable. The accessory may include power circuitry for receiving power from an external supply. In various embodiments of the present invention, the accessory can be powered by a battery located in the portable electronic device.

Also, these portable electronic devices can be used for text-based applications, for example, to view, create, and edit documents, and to send and receive email messages. Data, such as text and commands, can be input using a touchscreen, but some users may find they cannot enter information as fast as they can with a regular or laptop computer. Accordingly, another exemplary embodiment of the present invention provides an accessory having a dedicated alphanumeric entry device. This device can be a thumb pad, small keyboard, or other such interface. For example, a key pad where one or more keys correspond to a number and one or more letters can be used, where a letter is selected from the one or more letters by pressing the key one or more times. In other embodiments, the keyboard can be arranged to act as a remote control for one or more other electronic devices, such as televisions, home theaters, and the like.

In various embodiments of the present invention, the processing, computing, and related functions needed for gaming, text entry, recording, and other tasks may be performed by either the portable electronic device or the accessory. Alternately, both the portable electronic device and the accessory can share one or more of these tasks. For example, a game program may operate on a processor located on either a portable electronic device, such as a portable media player, or on an accessory. Alternately, a game program may operate partially on each device.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
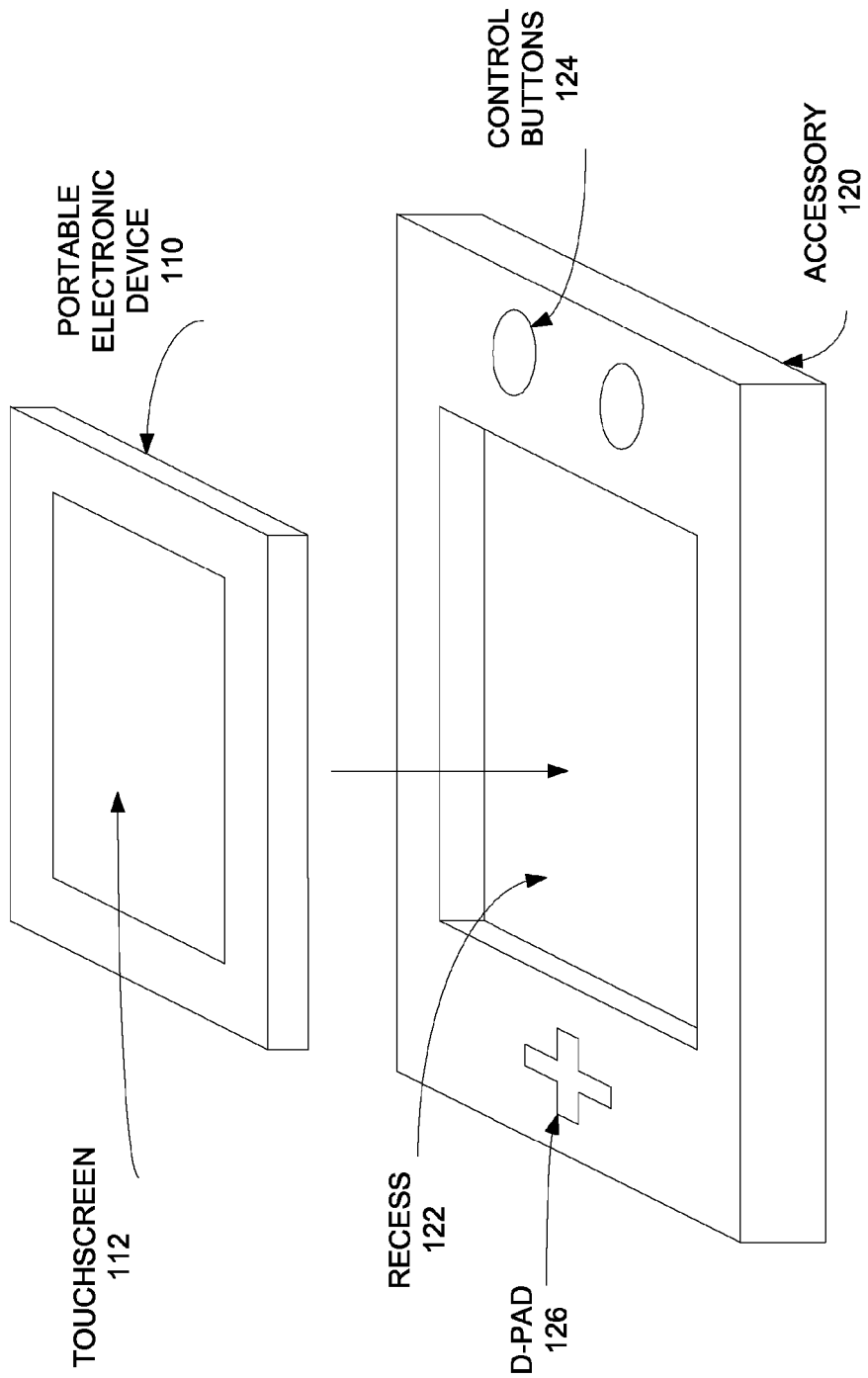
FIG. 1 illustrates a game accessory configured to receive a portable electronic device according to an embodiment of the present invention.

FIG. 1 illustrates a game accessory configured to receive a portable electronic device according to an embodiment of the present invention. This figure, as with the other included figures, is shown for illustrative purposes only and does not limit either the possible embodiments of the present invention or the claims.

Again, games, such as video or audio games, can be played on portable electronic devices such as portable media players. Some of these portable electronic devices include touchscreens that cover a majority or significant portion of one side of the player. These touchscreens display the video game action for the user. The user also inputs commands and instructions to the game by touching, tapping, or otherwise manipulating portions of the touchscreen. Accordingly, while a touchscreen is displaying an avatar's movements and actions, the user may input instructions and commands by touching the touchscreen. This disrupts the graphics, since graphics information for the command input is typically displayed. Also, the user's fingers block some of the view. Accordingly, embodiments of the present invention provide an accessory that accepts the portable electronic device and has control inputs that may be manipulated by a user. In this way, space is not needed on the touchscreen for command input graphics, and the user's view of the screen remains unobstructed. This accessory is also advantageous for use with devices having clickwheels or other input devices, as these input devices are not optimized for game playing.

In this example, portable electronic device 110 is inserted into game accessory 120. Game accessory 120 includes recessed portion 122 configured to receive portable electronic device 110. Portable electronic device 110 may snap into recess 122. In other embodiments of the present invention, portable electronic device 110 may slide into the recess 122 of accessory 120. In these examples, accessory 120 and portable electronic device 110 form a physical unit. In other embodiments of the present invention, accessory 120 need not include a recess 122. Instead, other means of attaching portable electronic device 110 to accessory 120 may be used. Accessory 120 can include one or more control buttons 124 and directional pad or D-pad 126. In other embodiments of the present invention, other features, such as a joystick (not shown), may be incorporated. Some specific examples of what may be included on accessories according to various embodiments of the present invention are shown in the figures below.

In a specific embodiment of the present invention, the portable electronic device 110 is a portable media player. In other embodiments of the present invention, other portable electronic devices, such as cell phones and palmtop computers, may be used. Portable electronic device 110 includes touchscreen 112. Again, touchscreen 112 provides a display and input interface. In other embodiments of the present invention, other types of portable electronic devices 110 may be used. For example, portable electronic devices 110 having clickwheels, passive screens, or other types of displays and user interfaces may be included.

In various embodiments of the present invention, the game accessory 120 is a hand-held device. That is, the game accessory can be held by a user using two hands. This enables the game accessory to be carried from place to place. This allows the game accessory to be used while commuting, flying, or just relaxing on the couch. In this specific example, D-pad 126 is shown on one side of accessory 120, while control buttons 124 are shown on a second side of accessory 120. This enables a user to manipulate D-pad 126 with her left thumb and control buttons 124 with her right thumb. The user can hold the device in this way and view the action using the screen on the portable electronic device 110, such as the touchscreen 112. In other embodiments of the present invention, the accessory 120 is a hand-held device that can be held in one hand while controls are manipulated with a second hand. In still other embodiments of the present invention, the accessory 120 can be held and the controls manipulated by one hand.

In various embodiments of the present invention, accessory 120 may include one, two, or more than two control buttons 124. These buttons may be used during the playing of a game for various purposes. Typically, these buttons are used to provide inputs to the game. For example, a control button may be used to select items from a menu. A control button may be used to make an avatar jump, shoot, pick up objects, or other activities, depending on the context of the game being played.

In various embodiments of the present invention, the accessory may include one, two, or more than two directional controls. These directional controls may be a D-pad, such as D-pad 126 in this example. The directional controls may also be a joystick or other such control. These directional controls may be used during the playing of a game for various purposes. These directional controls may provide directional data or information to the game program. Typically, these directional controls are used to control the movement of a portion of an image displayed on the screen of portable electronic device 110 during the playing of a game. For example, a directional control may be used to navigate through a menu. They may also be used to control the direction of an avatar's movement, or other action, depending on the context of the game being played. Also, instead of moving an avatar, the directional control may control the movement of a background relative to the avatar.

In an exemplary embodiment of the present invention, when a user manipulates the controls, electronic signals are generated in the accessory and provided to the portable electronic device. These signals are used by portable electronic device 110 in generating the images to be displayed on touchscreen 112. In this and other embodiments of the present invention, the processing, computing, and other tasks may be performed by portable electronic device 110 and accessory 120, either alone or in combination.

Game accessory 120 may include memory for retaining game status information such as scores and other information. The memory may also retain user identification information. This allows the game accessory to track game information for a number of users. This is particularly useful where multiple siblings share one game accessory 120. It is also useful for public or semi-public areas such as doctors' offices, restaurants, and other locations that a user may visit on an intermittent basis. By storing user identification and game status information, users may periodically access the game accessory and resume game playing, even after protracted periods of absence. The memory may be volatile or non-volatile memory.

The configuration shown in this example is particularly good for games where the action happens on a landscape. In other situations, it is desirable to hold the game in a portrait fashion. This is particularly useful for games where, for example, objects are falling from the sky and need to be made to fit together in an organized fashion. An example of such a game accessory is shown in the following figure.

Figure 2:
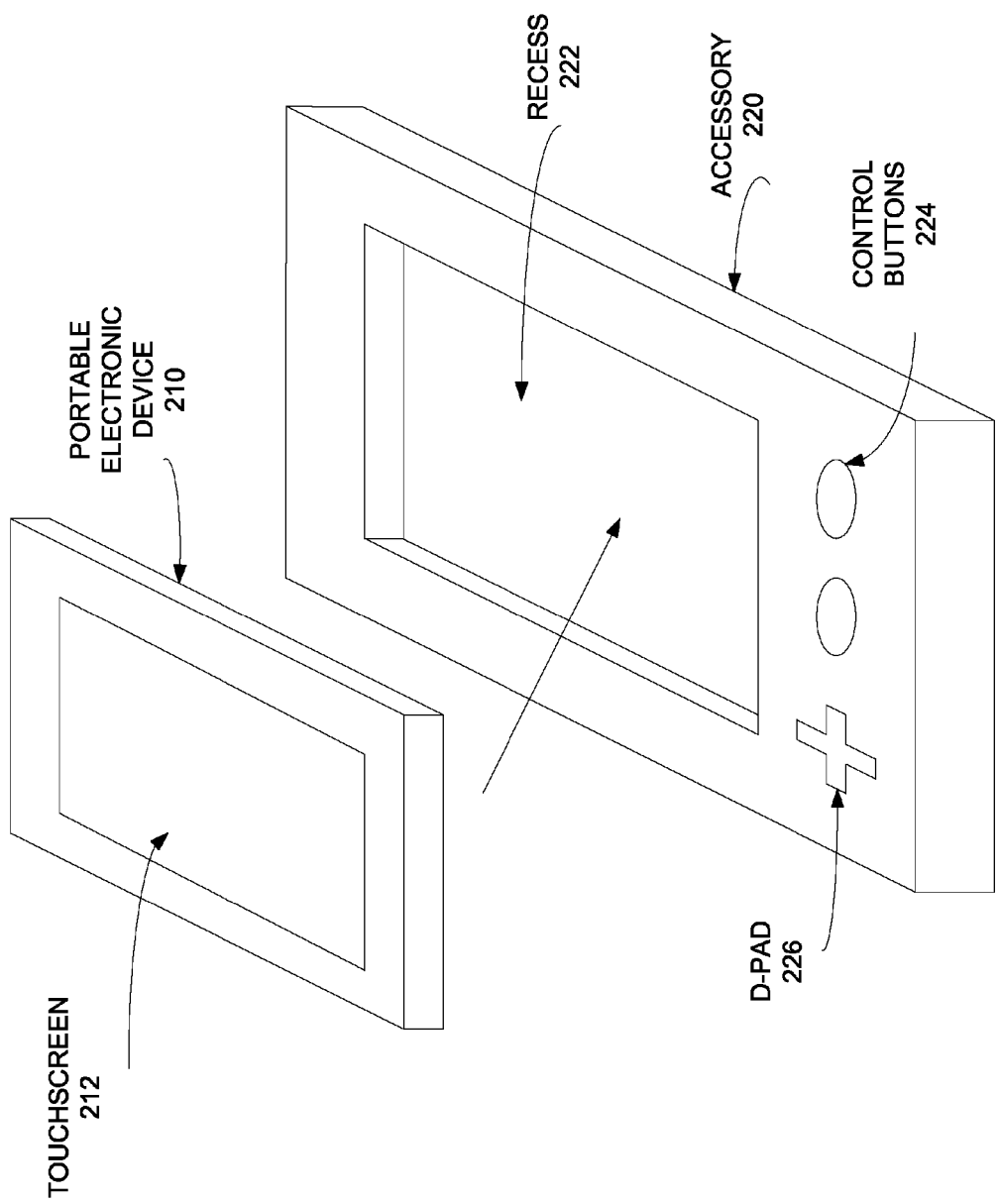
FIG. 2 illustrates another game accessory configured to receive a portable electronic device according to embodiment of the present invention.

FIG. 2 illustrates another game accessory configured to receive a portable electronic device according to an embodiment of the present invention. As before, accessory 220 includes recessed portion 222 configured to physically receive a portable electronic device 210, which may be a portable media player. In other embodiments the present invention, other mechanisms besides recess 222 may be used.

As before, D-pad 226 and one or more control buttons 224 may be included. In other embodiments of the present invention, other features, such as a joystick (not shown), may be incorporated.

Again, in other embodiments of the present invention, game accessory 220 may be configured to fit other portable electronic devices, such as cell phones, palmtop computers, and other devices. In this example, portable electronic device 210 includes touchscreen 212. Again, touchscreen 212 provides a display and input interface. In other embodiments of the present invention, other types of portable electronic devices 210 may be used. For example, portable electronic devices 210 having clickwheels, passive screens, or other types of displays and user interfaces, may be included.

In this specific example, D-pad 226 and control buttons 124 are shown on a lower end of accessory 220. This enables the user to manipulate D-pad 226 with her left thumb and control buttons 224 with her right thumb. This configuration is particularly good for games where the action happens in a portrait manner. The use can view the game images (if any) on the screen of the portable electronic device 210.

As before, when a user manipulates the controls, electronic signals are generated in the accessory and provided to the portable electronic device. These signals are used by portable electronic device 210 in generating the images to be displayed on touchscreen 212. In this and other embodiments of the present invention, the processing, computing, and other tasks may be performed by portable electronic device 210 and accessory 220, either alone or in combination.

Current portable electronic devices are not just useful for games, but can also be used to review, edit, and create documents, to send and receive e-mails, and to browse the Internet, among a myriad of other applications. As part of these activities, a user often needs to enter text and other alphanumeric information into the portable electronic device. Text entry can also be part of a game.

Some portable electronic devices that can be used for text entry may include touchscreens. In such a situation, a portion of the touchscreen can be used to display a virtual keyboard or other alphanumeric pad. The user can then touch keys on the touchscreen to enter data. However, when doing so, this keyboard consumes part of the screen area, reducing the amount useable for reading text. Also, the user enters text without experiencing a tactile response. Accordingly, another embodiment of the present invention provides an accessory for receiving a portable electronic device, where the accessory includes a thumb or other type of keypad. An example is shown in the following figure.

Figure 3:
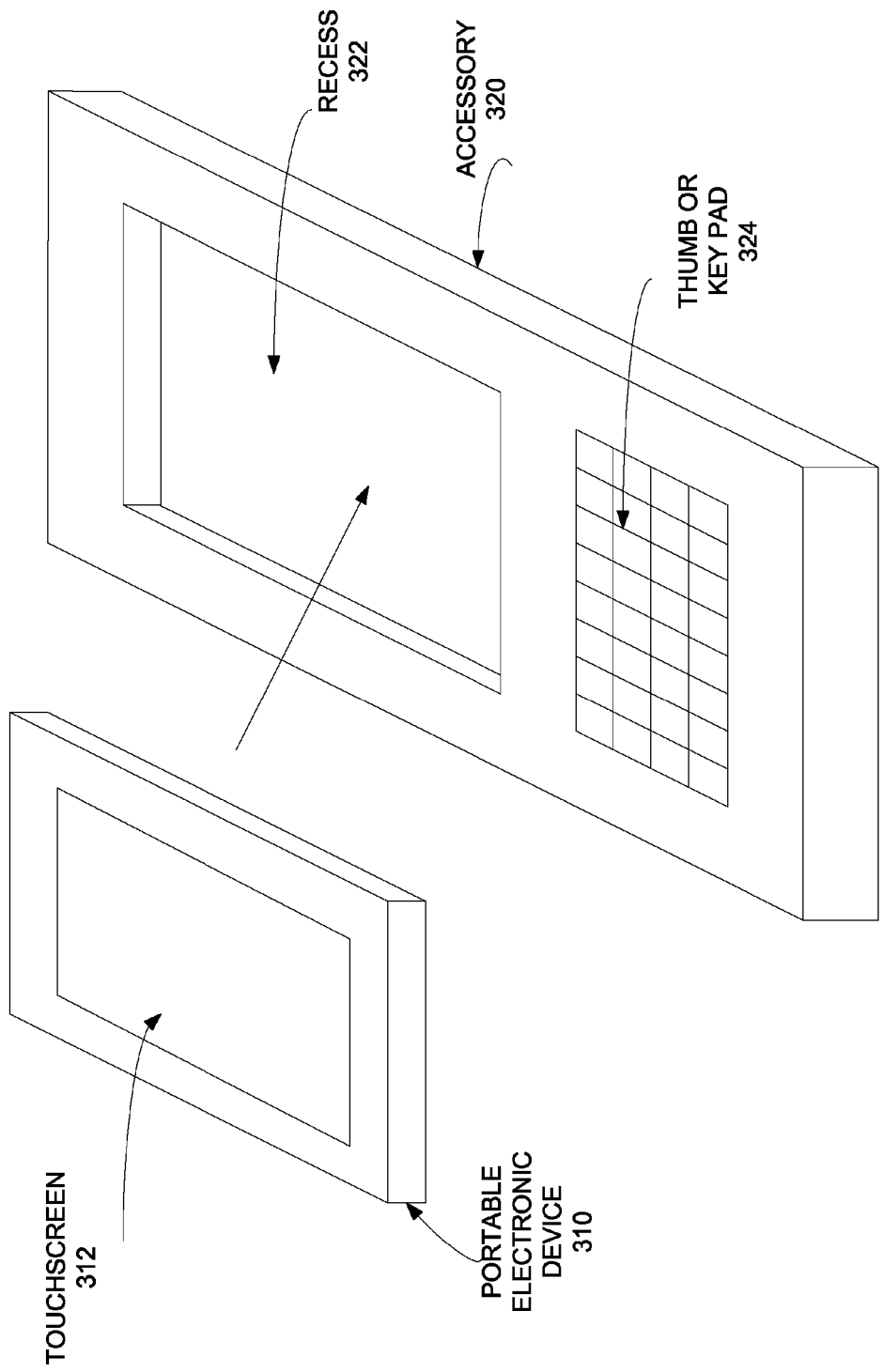
FIG. 3 illustrates a game accessory configured to receive a portable electronic device, the game accessory including a thumb or keypad, according to an embodiment of the present invention.

FIG. 3 illustrates a game accessory configured to receive a portable electronic device, the accessory including a thumb or keypad, according to an embodiment of the present invention. This game accessory is of particular use in playing text-based games. In this example, accessory 320 includes recess 322 configured to accept a portable electronic device, in this example, portable electronic device 310. As before, portable electronic device 310 includes touchscreen 312. The portable electronic device in this and the other included examples may be a portable media player.

Game accessory 320 further includes thumb or keypad 324. Thumb or keypad 324 may be a thumb pad, where keys on a left side are intended to be manipulated by a user's left thumb and where keys on a right side are intended to be manipulated by a user's right thumb. In other embodiments of the present invention, thumb or keypad 324 may include a full keyboard where the keys are separated from one another. In still other embodiments of the present invention, a 12-key keypad may be used, where keys for the numbers zero through nine, pound, and star are included. In one example, text may be entered using these keys by pressing a key one or more times. In other embodiments of the present invention, keypad 324 may be arranged such that accessory 320 provides a remote control for one or more an external electronic devices.

In other embodiments of the present invention, other features may be included in the accessory according to embodiments of the present invention. For example, it may be desirable to provide camera features for still or video image capture. It may also be desirable to include a speaker or microphone. Other circuitry, for example circuitry to detect movement or to provide a vibration to a user holding the accessory, may be included. An example is shown in the following figure.

Figure 4:
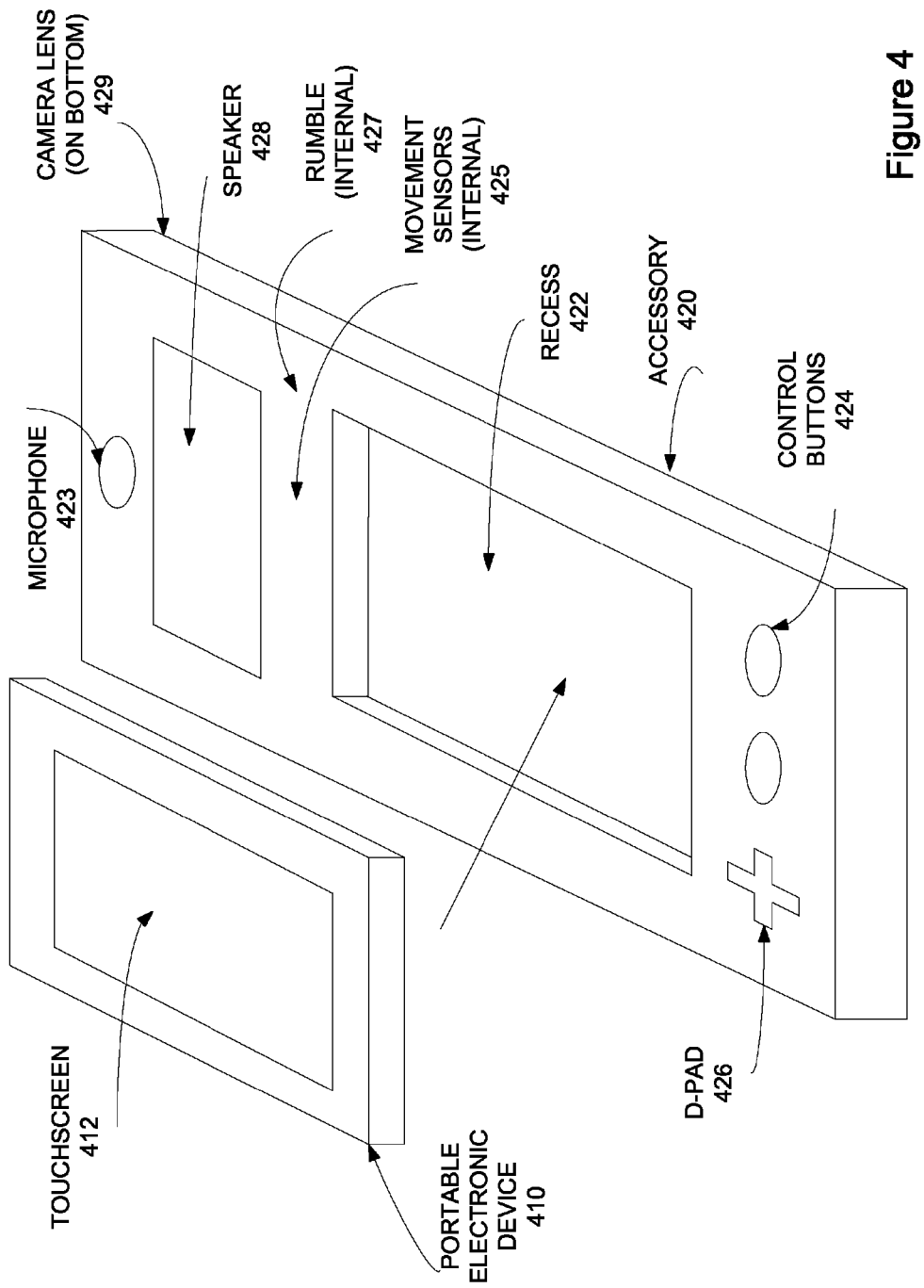
FIG. 4 illustrates a game accessory having a number of features according to an embodiment of the present invention.

FIG. 4 illustrates a game accessory having a number of features according to an embodiment of the present invention. While several features are shown in this example, various embodiments of the present invention may provide game accessories having one or more of these or other features.

As before, accessory 420 includes recess 422 configured to physically receive a portable electronic device 410, which may be a portable media player. In other embodiments of the present invention, other mechanisms for receiving and affixing a portable electronic device may be used by accessory 420. In this example, portable electronic device 410 includes touchscreen 412.

Game accessory 420 includes control buttons 424 and D-pad 426, as before. In other embodiments of the present invention, accessory 420 may include a joystick (not shown.) This example further includes microphone 423 for receiving voice or other audio information. Movement sensors 425 may be included to detect movement of accessory 420. Rumble circuitry and mechanisms 427 may also be included to provide vibration of accessory 420. Camera lens 429 may also be included. Still and video image sensors and circuitry may be included internally to the device. Speaker 426 may also be included.

Various embodiments of the present invention may make use of an accelerometer. An accelerometer can determine movement of an electronic device. This accelerometer can be located in either the portable electronic device 410 or the game accessory 420. This enables movement, such as rotational movement, of the portable electronic device 410 and game accessory 420 combination t to be part of the game. In one specific embodiment of the present invention, the game accessory 420 is a steering wheel. The steering wheel may have a recess or other attachment surface into which the portable electronic device 410 may be placed.

In some embodiments of the present invention, portable electronic device 410 may be or include a phone. In such a situation, it is desirable to be able to use the phone when it is being used with accessory 420. Accordingly, microphone 423 and speaker 426 may be used to speak and listen during a phone conversation.

In this example, D-pad 436 and control buttons 424 are located on one end of accessory 420. In other embodiments of the present invention, these may be separated on each side of accessory 420, as shown in FIG. 1.

In the above examples, a screen on the portable electronic device is used for viewing game action, text, e-mail, or other graphical information. User interface control occurs at accessory 420 by the manipulation of control buttons, D-pads, or keypads as shown above. In other embodiments of the present invention, it may be desirable to include a second screen on the accessory. In such a situation, where the screen of the portable electronic device is a touchscreen, the touchscreen may be used to receive commands and instructions from a user and to provide first graphics, while the second screen provides second graphics. Alternately, where the screen of the portable electronic device is a passive screen, the passive screen may be used to provide first graphics, while a second screen provides second graphics. In still other embodiments, the second screen is a touchscreen. In other embodiments of the present invention, both screens are touchscreens. An example is shown in the following figure.

Figure 5:
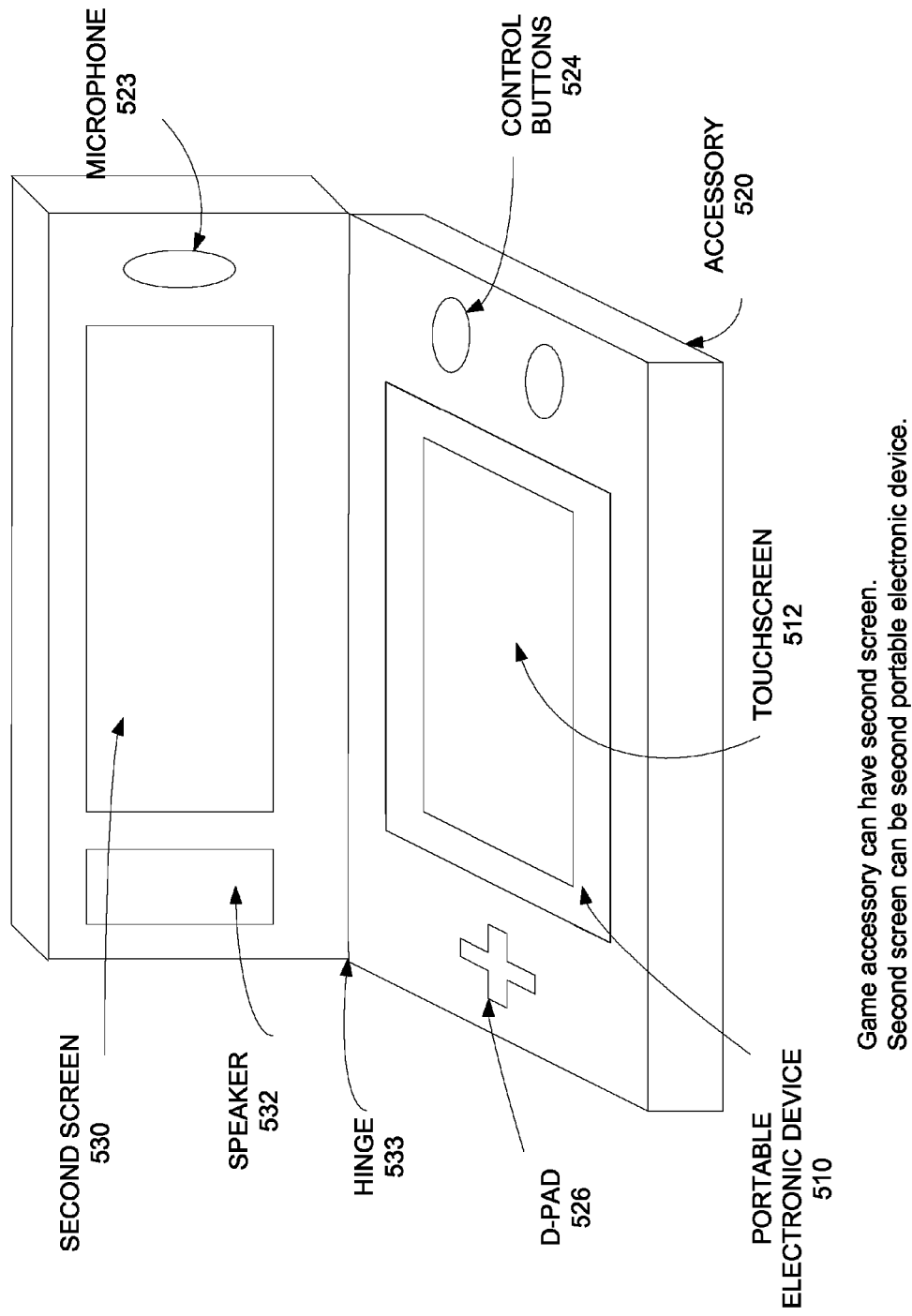
FIG. 5 illustrates a game accessory configured to receive a portable electronic device, the accessory including a second screen, according to an embodiment of the present invention.

FIG. 5 illustrates a game accessory configured to receive a portable electronic device, the accessory including a second screen, according to an embodiment of the present invention. This figure includes accessory 520 that is configured to accept a portable electronic device 510, which may be a portable media player. Portable electronic device 510 includes touchscreen 512. Control buttons 524 and D-pad 526 are located on a lower portion of accessory 520.

Game accessory 520 includes an upper portion that, in this example, includes second screen 530, speaker 532, and microphone 523. The upper and lower portions are hinged together by hinge 533. Hinge 533 allows the upper portion and lower portion to be open for use, or closed for storage and transportation.

In this example, the lower screen is touchscreen 512, while the upper screen or second screen 530 is passive. This allows the user to input and view first graphical information on lower touchscreen 512, and to view second graphical information on second screen 530. In one example, touchscreen 512 may show first graphics including a number of tools that may be selected. Second screen 530 may display second graphics showing an avatar using the selected tools. Other types of command inputs may be received via microphone 523. Sound may be played back using speaker 532.

In some current portable electronic devices, information is provided on a screen in either portrait or landscape modes, depending on how a user holds the player. Specifically, if a user holds the player in a portrait orientation, graphics information is provided in the portrait mode, while if a user holds the player in a landscape orientation, graphics information is provided in the landscape mode. In various embodiments of the present invention, game play might become dynamic with the accessory moving in a number of different directions and having a number of different orientations. That is, a user may alternately hold the device in portrait and landscape orientations. In such a situation, it is undesirable for the screen mode to change between display modes. Accordingly, various embodiments of the present invention disable the rotating display feature in the portable electronic device. For example, the accessory shown in FIG. 1 may keep the display mode of the portable electronic device in the landscape mode, while the accessory shown in FIG. 2 may keep the display mode of the portable electronic device in the portrait mode, despite a changing orientation.

Also, since game play, or text entry, for that matter, may become dynamic, it may be desirable to securely attach the portable electronic device to the accessory. An example is shown in the following figures.

Figure 6A:
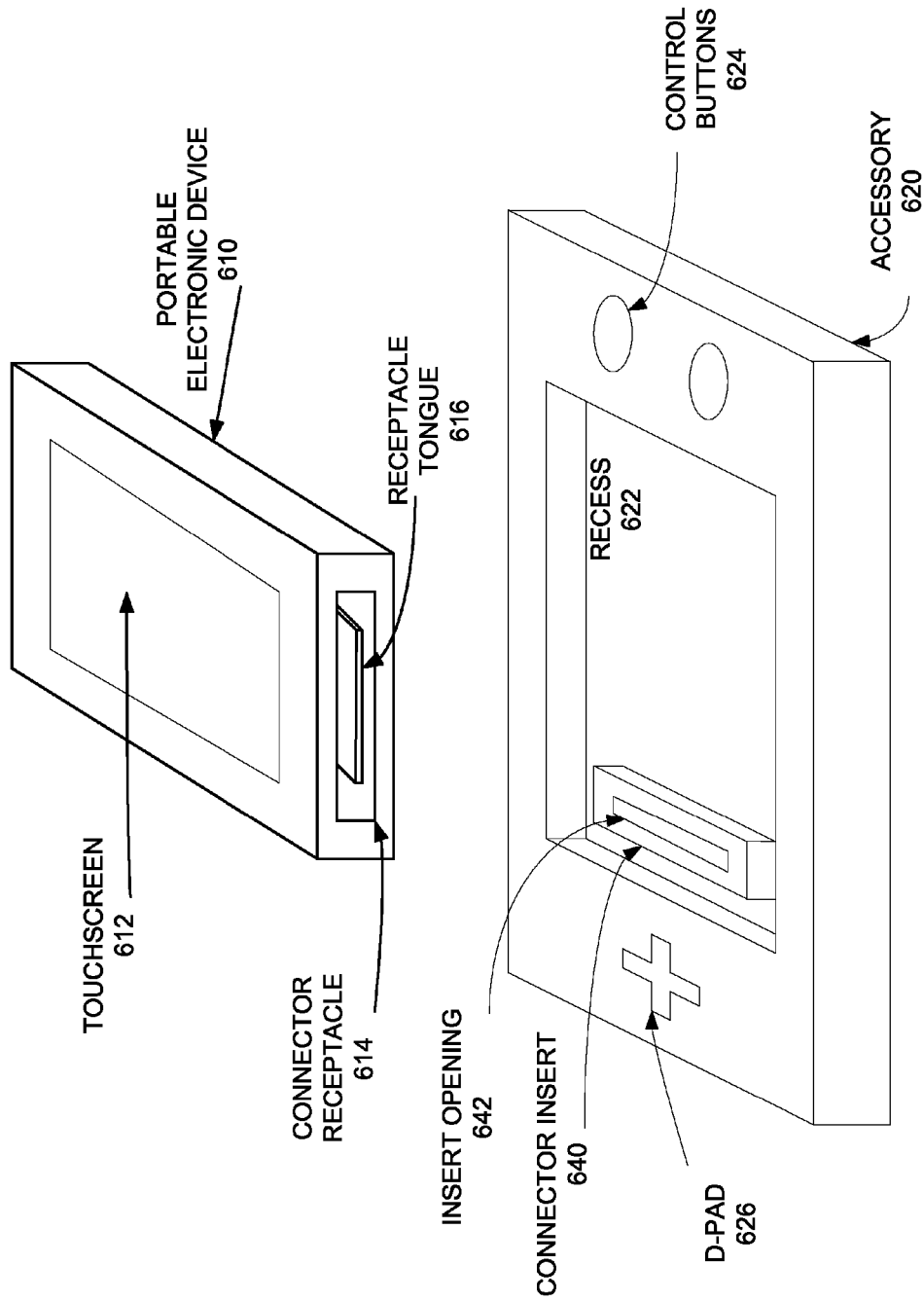
FIGS. 6A-6B illustrate a game accessory configured to receive a portable electronic device according to an embodiment of the present invention.
Figure 6B:
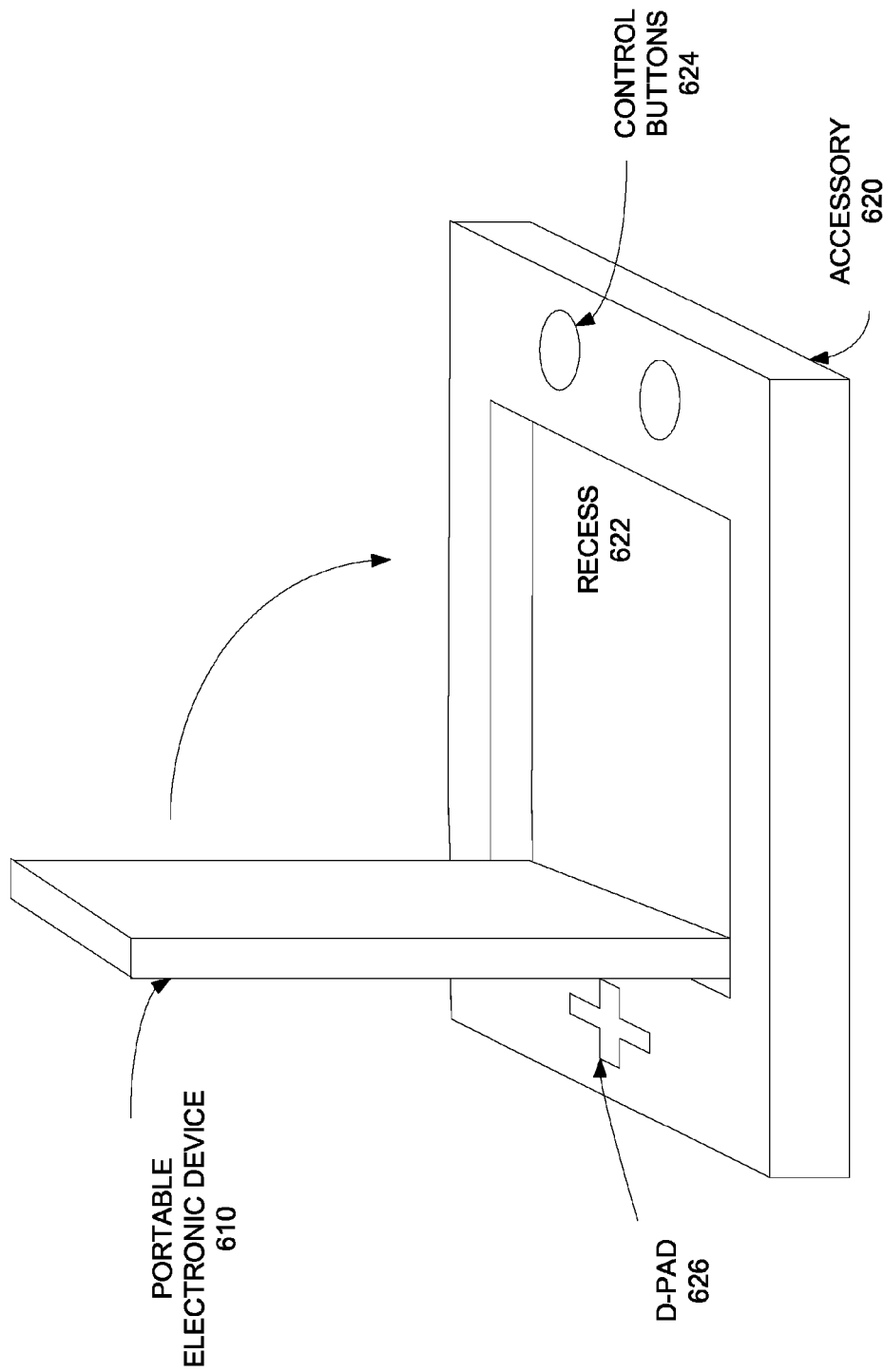

FIGS. 6A-6B illustrate an accessory configured to receive a portable electronic device according to an embodiment of the present invention. In FIG. 6A, the portable electronic device 610 may be a portable media player that includes connector receptacle 614. Connector receptacle 614 further includes connector receptacle tongue 616 that may have one or more contacts located on it. An example of a connector receptacle and insert that may be used can be found in co-pending U.S. patent application Ser. No. 10/423,490, filed Apr. 25, 2003, titled Media Player System, which is incorporated by reference.

This receptacle accepts connector insert 640 located on accessory 620. Connector insert 640 includes insert opening 642 that accepts receptacle tongue 616. Insert opening 642 can include one or more contacts arranged to mate with contacts on receptacle tongue 616.

In FIG. 6B, portable electronic device 610 rotates into recess 622. Specifically, connector insert 640 rotates 90 degrees, allowing portable electronic device 610 to lie in accessory 620. When the portable electronic device 610 is in the accessory 620, a top surface of the portable electronic device 610 may be substantially flush with a top surface of the game accessory 620. In other embodiments of the present invention, the top surface of the portable electronic device 610 may be offset from the top surface of the game accessory 620. In a typical embodiments of the present invention, the top surface of the portable electronic device 610 is parallel with the top surface of the game accessory 620.

The physical connection between connector receptacle 614 and connector insert 640 provides some amount of physical security between accessory 620 and portable electronic device 610. This security can be enhanced in a number of ways. For example, a transparent cover, such as a cover made of plastic, may fit over portable electronic device 610 holding it in place. In other embodiments of the present invention, clips or other mechanisms, particularly employed at the far end of the accessory away from the connector insert, can be used to secure portable electronic device 610 in accessory 620. These may include elastomeric clasps or other engaging members. In other embodiments of the present invention, other mechanisms, such as Velcro or suction cups, may be used.

In some embodiments of the present invention, it is desirable that accessory 620 be able to accept a number of different types of electronic devices or portable media players having different shapes and sizes. In these circumstances, adapters or removable inserts may be used to provide a proper and secure fit between portable electronic device 610 and accessory 620.

While a connector system including a connector receptacle and connector insert is shown in these figures, in other embodiments of the present invention it is desirable to have a game accessory that can communicate with a wireless portable electronic device. For example, a portable electronic device may not include a connector receptacle. An example is shown in the figure described below.

Figure 7:
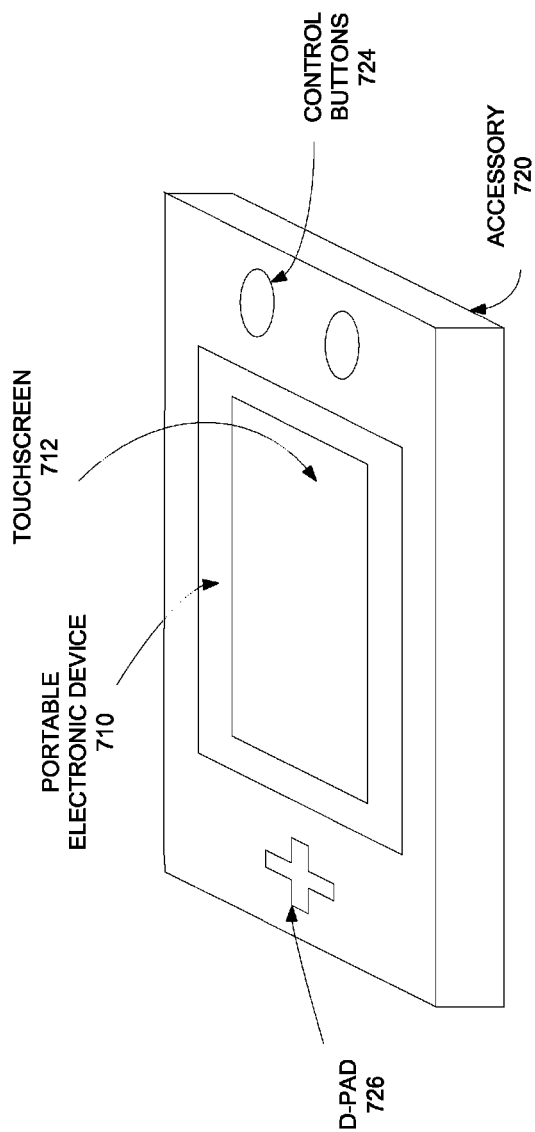
FIG. 7 illustrates a game accessory that can wirelessly communicate with a portable electronic device according to an embodiment of the present invention.

FIG. 7 illustrates a game accessory that can wirelessly communicate with a portable electronic device according to an embodiment of the present invention. This wireless communication eliminates the need for a connector insert. This wireless communication can be achieved using Bluetooth, WiFi, or other standard or proprietary wireless technologies.

It is often desirable to play these games against other people. Accordingly, it is desirable that a first accessory used by a first user can communicate with a second accessory used by a second user. This allows head-to-head play. In various embodiments of the present invention, this communication can either be direct or indirect. For example, it may be direct, that is, point-to-point. It may instead be indirect, for example, over a router, Internet, or other data connection. In various embodiment of the present invention, this communication may be all or partially wireless. An example is shown in the following figure.

Figure 8:
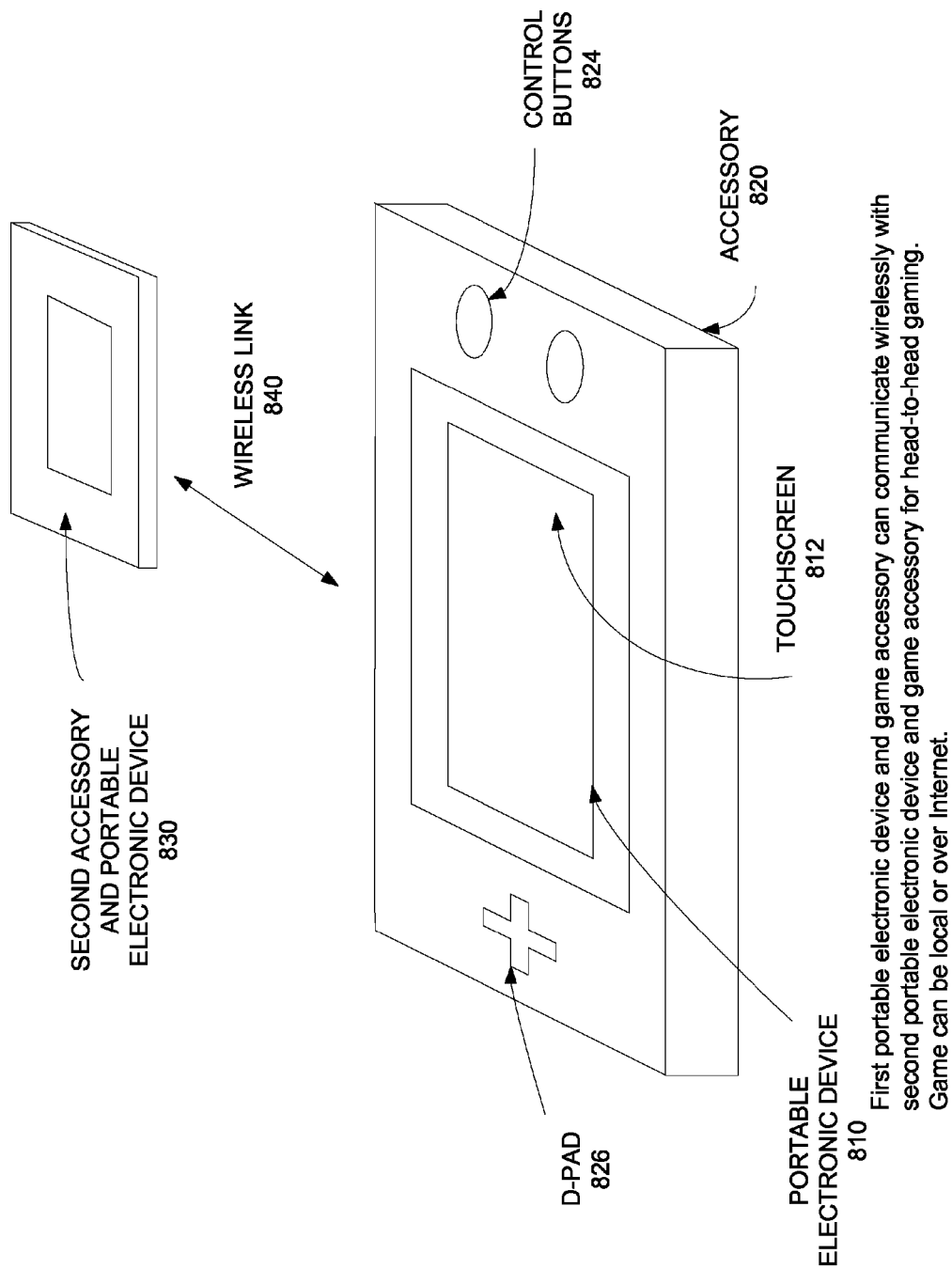
FIG. 8 illustrates wireless communication between a first and second game accessory according to an embodiment of the present invention.

FIG. 8 illustrates wireless communication between a first and second game accessory according to an embodiment of the present invention. This figure includes game accessory 820 adapted to receive portable electronic device 810. The portable electronic device 810 may be a portable media player. Game accessory 820 includes wireless circuitry for forming wireless link 840 with a second game accessory and portable electronic device 830. Wireless link 840 may be a point-to-point wireless link as shown. Alternately, wireless link 840 may include one or more nodes, wireless hubs, routers, modems, Internet connections, or other wired or wireless circuitry. As before, the wireless link may use Bluetooth, WiFi, or other standard or proprietary wireless technologies.

In this example, the first user sees information displayed on portable electronic device 810, while a second user sees what is displayed on the second accessory and portable electronic device 830. In other embodiments of the present invention, it is desirable to include other display information on one or more other monitors. An example is shown in the following figure.

Figure 9:
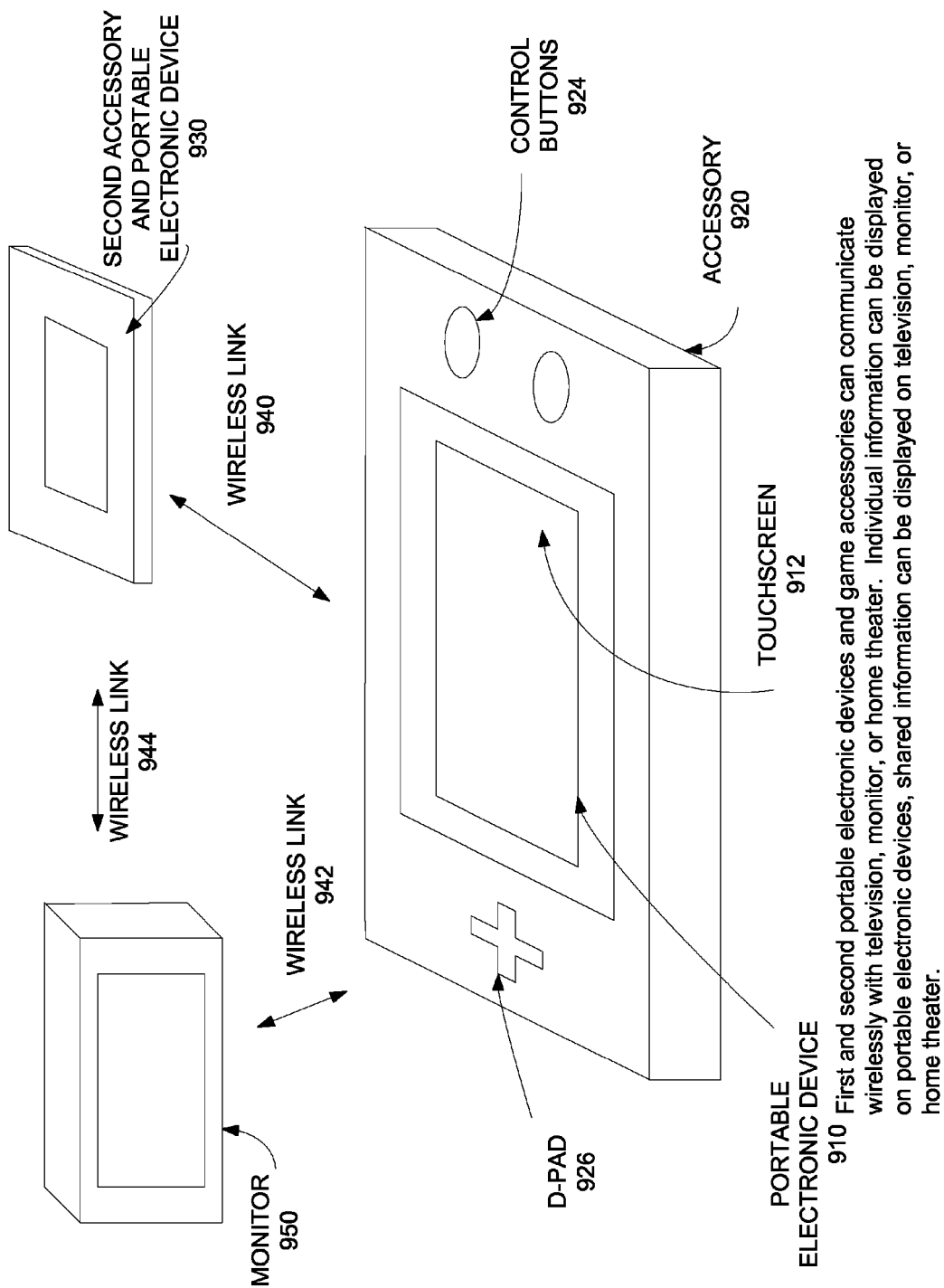
FIG. 9 illustrates a game accessory adapted to receive a portable electronic device and communicate with other accessories and electronic devices according to an embodiment of the present invention.

FIG. 9 illustrates a game accessory adapted to receive a portable electronic device and communicate with other accessories and electronic devices according to an embodiment of the present invention. In this example, the portable electronic device 910 can be a portable media player. Accessory 920 is in communication with a second accessory and portable electronic device 930 using wireless link 940. Accessory 920 is in further communication with monitor 950 over wireless link 942. Monitor 950 is also in communication with the second accessory and portable electronic device 930 over wireless link 944. As before, the wireless link may use Bluetooth, WiFi, or other standard or proprietary wireless technologies.

In this situation, first graphics information can be provided to the first user using portable electronic device 910, while second graphics information is provided to a second user using a second accessory and portable electronic device 930. Additional graphics information can be provided to both users using monitor 950. Monitor 950 may be a single monitor. Alternately, it may be two monitors, for example, where the first and second users are remote from one another.

This configuration allows first information to be displayed on a first screen and second information to be displayed on a second screen. For example, the first information may include information regarding controls for an automobile. The second information may show positions of two or more cars on a racetrack.

In various embodiments of the present invention, it is also desirable to communicate with other electronic devices, such as audio systems and monitors. For example, it may be desirable to have music playback over a home audio system. It may also be desirable to view graphics information using a larger monitor. An example of this is shown in the following figure.

Figure 10:
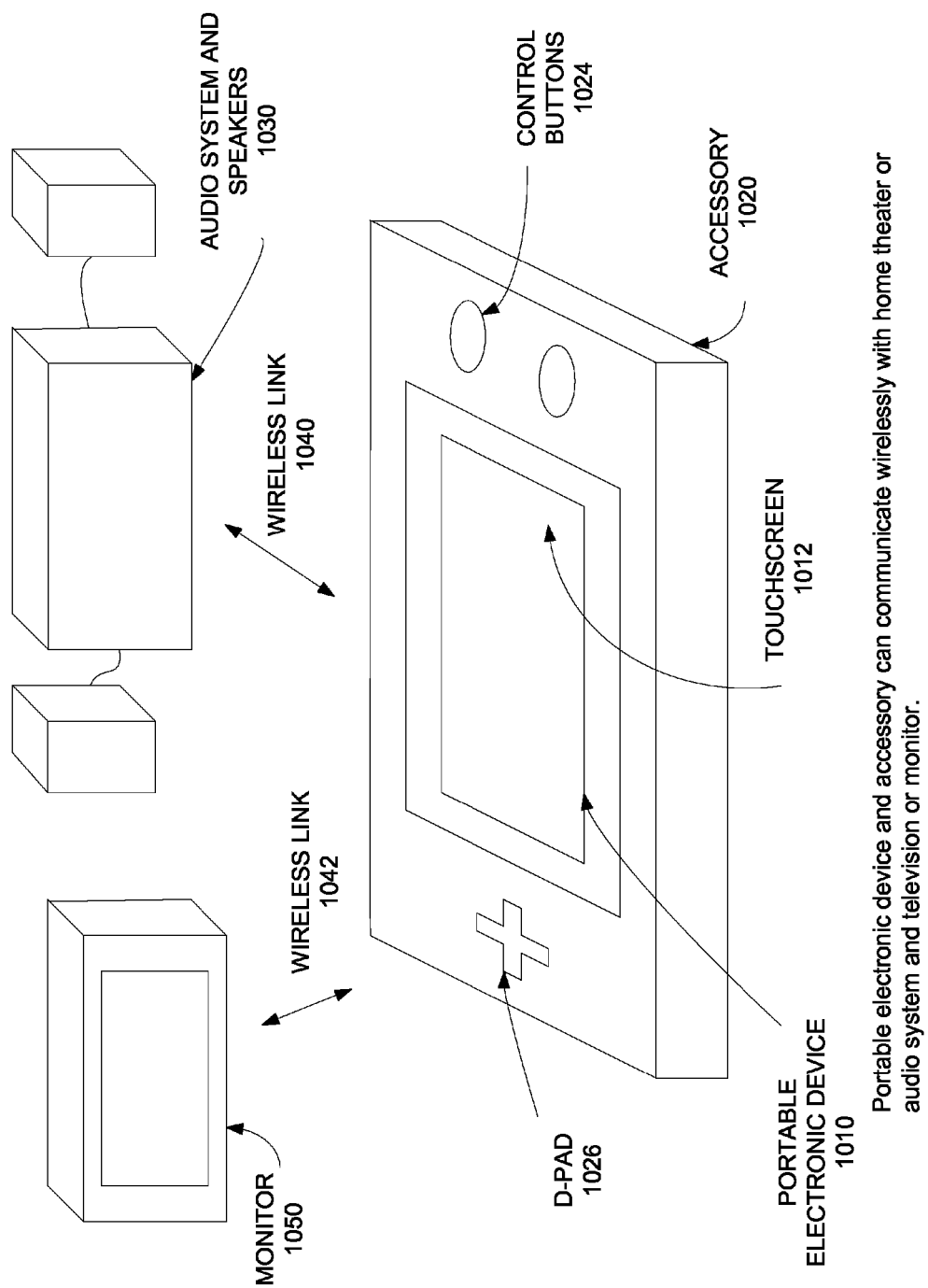
FIG. 10 illustrates a game accessory configured to receive a portable electronic device and be in wireless communication with other electronic devices according to an embodiment of the present invention.

FIG. 10 illustrates a game accessory configured to receive a portable electronic device and to be in wireless communication with other electronic devices according to an embodiment of the present invention. Accessory 1020 is in communication with an audio system over wireless link 1040 and display monitor 1050 over wireless link 1042. In this configuration, a user may play a game where first graphics information is provided on touchscreen 1012 on portable electronic device 1010 and second graphics information is provided on monitor 1050. Sound can be provided by the accessory to audio system speakers 1030 over wireless link 1040. As before, the wireless links may use Bluetooth, WiFi, or other standard or proprietary wireless technologies.

In this and the other examples, a user manipulates input controls such as control buttons, D-pads, or joysticks. Circuitry converts these manipulations to electronic signals and provides them to a portable electronic device, such as a portable electronic device. Simplified circuitry employed by such an accessory is shown in the following figure.

Figure 11:
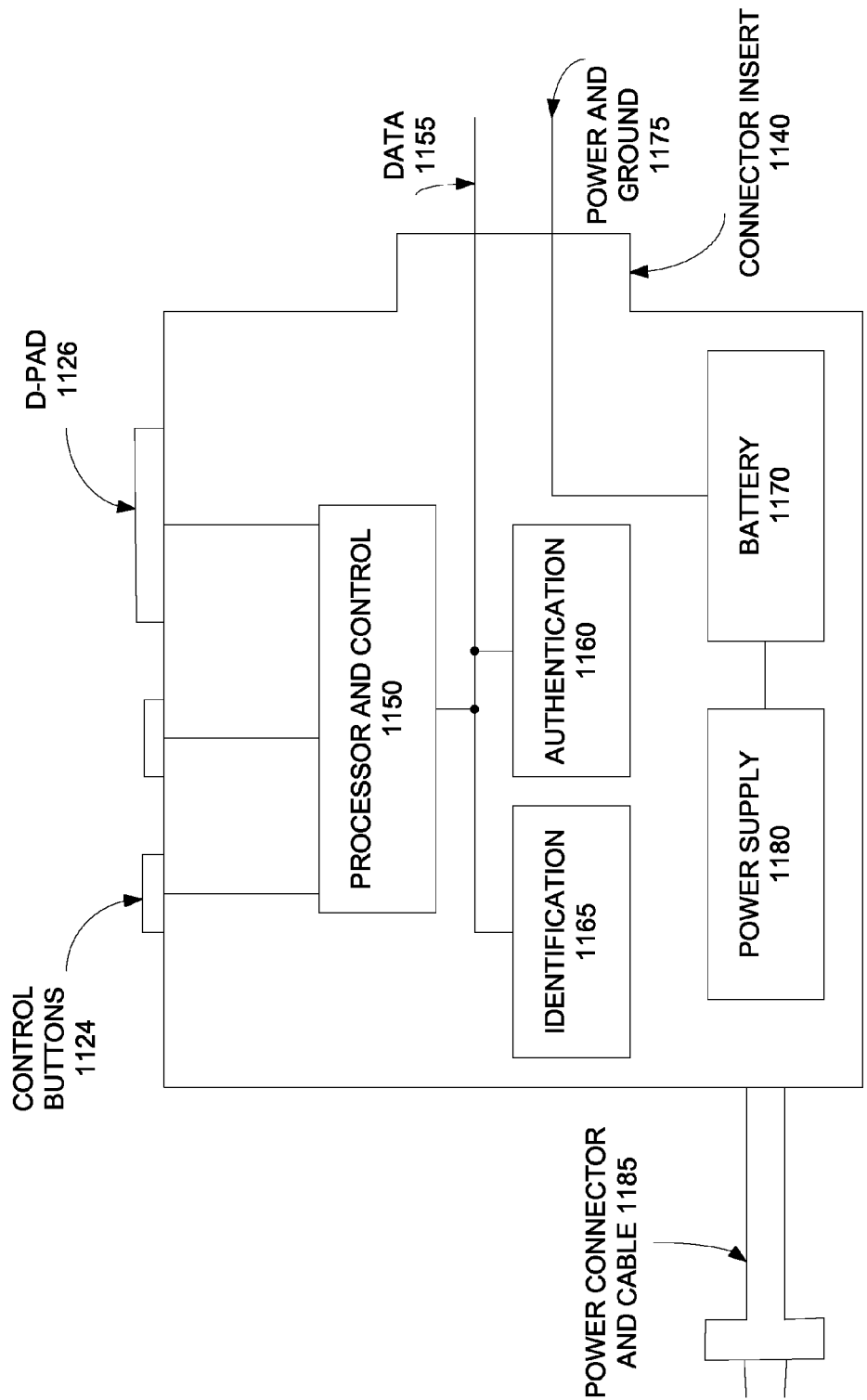
FIG. 11 illustrates circuitry that may be employed by a game accessory according to an embodiment of the present invention.

FIG. 11 illustrates circuitry that may be employed by a game accessory according to an embodiment of the present invention. Again, the game accessory includes control inputs, shown in this example as control buttons 1124 and D-pad 1126. As these buttons are manipulated, signals are provided to processor and control circuitry 1150. Specifically, when control button 1124 is manipulated or actuated, a first circuit, which may be part of processor and control circuitry 1150 or a separate circuit (not shown), responds. Also, when D-pad 1126 or other directional input is manipulated or actuated, a second circuit, which may be part of processor and control circuitry 1150 or a separate circuit (not shown), responds. A third circuit, which again may be part of processor and control circuitry 1150 or a separate circuit (not shown), provides signals on data lines 1155 to connector insert 1140 that are or relate to the responses by the first and second circuits. These data signals are received at a connector receptacle located on a portable electronic device (not shown.) In other embodiments of the present invention, data signals 1155 are provided as wireless signals.

In various embodiments of the present invention, it is desirable that the game accessory identifies itself to the portable electronic device. In this way, the portable electronic device knows what kinds of signals to send to the accessory and what types of signals may be received from the accessory. Also, it may be desirable that the accessory receives identification information from the portable electronic device. This information may inform the accessory as to what types of signals to provide to the portable electronic device, and what types of signals it may in turn receive from the portable electronic device. Accordingly, authorization and identification circuitry 1165 is included.

In various embodiments of the present invention, it is also desirable that the accessory authenticates itself to the portable electronic device. Accordingly, authentication circuitry 1160 is included. This circuitry may respond to a request for authentication by the portable electronic device. Alternately, the accessory may provide authentication information on its own.

The game accessory may further include battery 1170. Battery 1170 may be a fixed battery or a rechargeable battery. A rechargeable battery may be recharged by power supply 1180. Power supply 1180 may provide power to the accessory, or battery 1170 may provide power to the accessory. Power connector and cable 1185 may be used to provide power to power supply 1180, which may then provide power to the accessory and battery 1170. Battery 1170 or power supply 1180 may also provide power over lines 1175 to the portable electronic device. In other embodiments of the present invention, a battery on the portable electronic device (not shown) may provide power the accessory.

Figure 12:
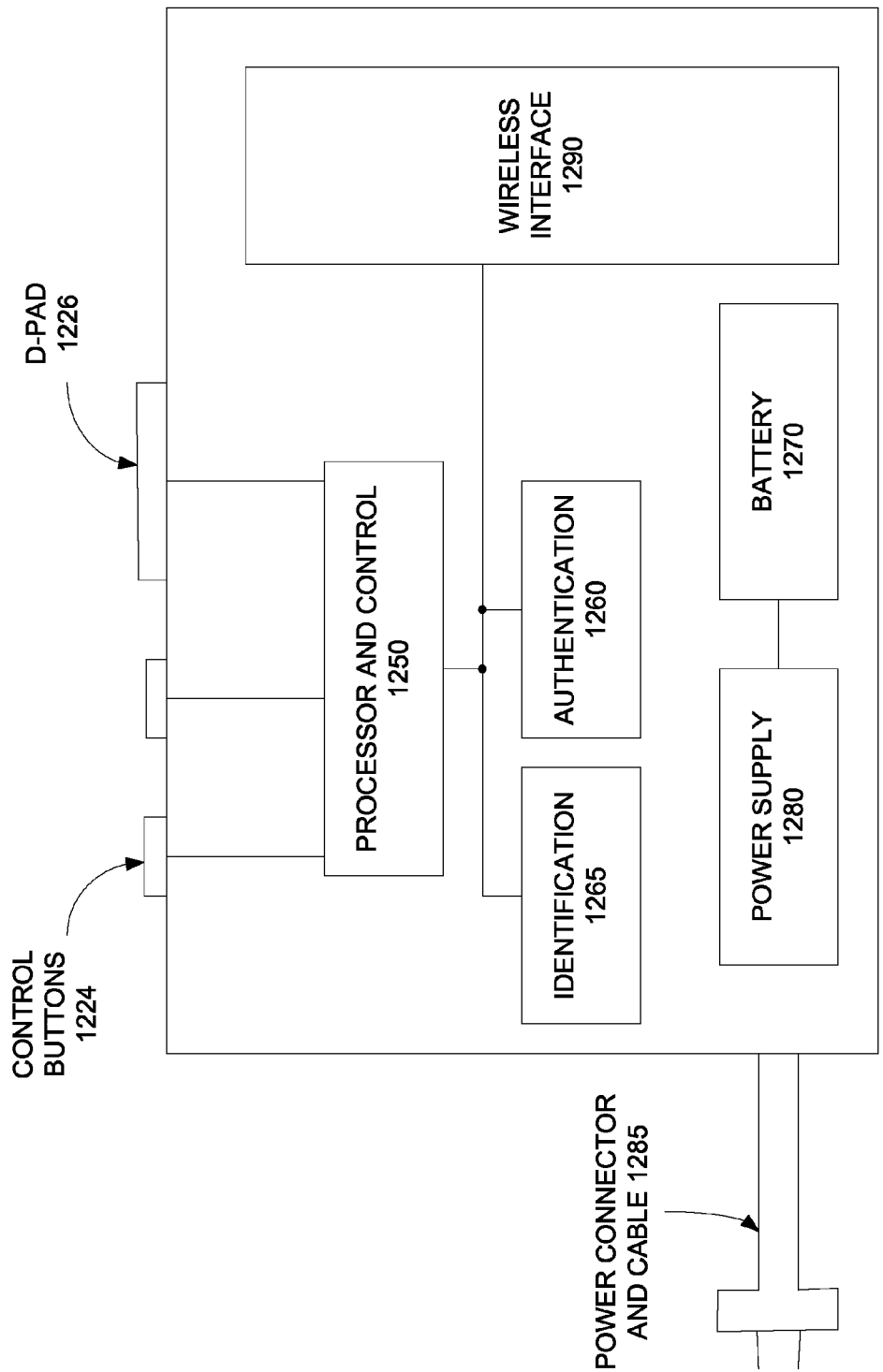
FIG. 12 illustrates circuitry that may be employed by a wireless game accessory according to an embodiment of the present invention.

FIG. 12 illustrates circuitry that may be employed by a wireless game accessory according to an embodiment of the present invention. In this example, connector insert 1140 is not needed. Instead, wireless interface circuit 1290 is used to wirelessly communicate with other accessories and other electronic devices. As before, the wireless link may use Bluetooth, WiFi, or other standard or proprietary wireless technologies. Wireless interface circuit 1290 may be a transmitter where the accessory only provides inputs to a portable electronic device. Alternately, it may be a transceiver, where information is shared between the accessory and the portable electronic device. In still other embodiments of the present invention, wireless interface circuit 1290 may be a receiver.

Figure 13:
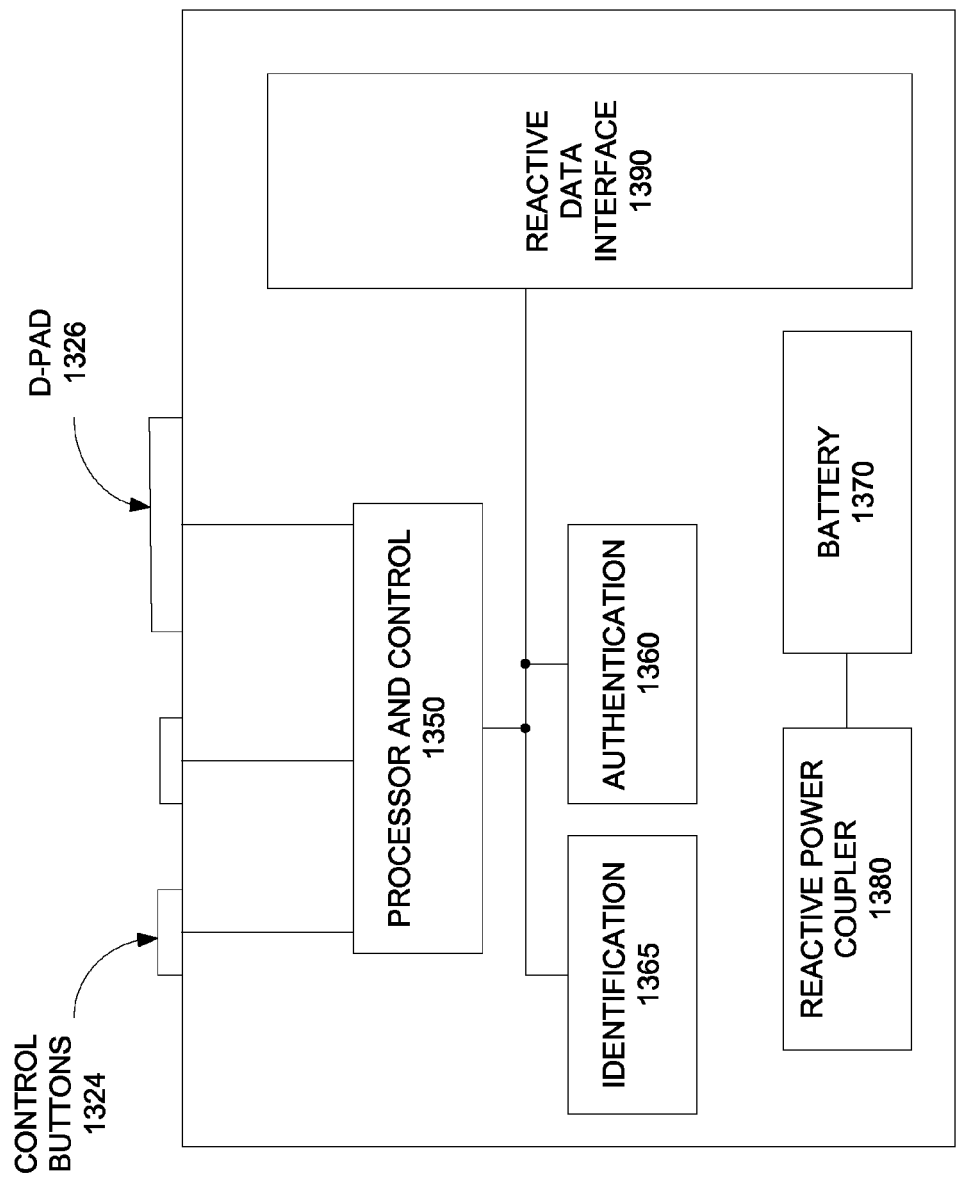
FIG. 13 illustrates circuitry that may be employed by a game accessory according to an embodiment of the present invention

FIG. 13 illustrates circuitry that may be employed by a game accessory according to an embodiment of the present invention. In this example, connector insert 1140 is not needed. Instead, reactive data interface circuit 1390 is used to communicate with a portable electronic device. The reactive data interface may employ inductive or capacitive coupling. Reactive data interface circuit 1390 may be a transmitter where the accessory only provides inputs to a portable electronic device. Alternately, it may be a transceiver, where information is shared between the accessory and the portable electronic device. In still other embodiments of the present invention, reactive data interface circuit 1390 may be a receiver. Power may also be received or provided reactively. Specifically, reactive power coupler 1380 may be used to receive or supply power to a portable electronic device, such as a portable media player. The reactive power coupler 1380 may employ inductive or capacitive coupling.

Software, such as a video or audio game, text entry, email, or other program, may operate on a processor or other electronic circuit located on a portable electronic device attached to the accessory. Alternately, it may operate on a processor or other circuitry located on the accessory. For example, they may run on processors 1150, 1250, and 1350 in the above examples. In other embodiments of the present invention, these programs may run partially on both the accessory and the portable electronic device.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A game accessory to attach to a portable electronic device, the game accessory comprising:
   a body;
   a recess formed in the body and sized to physically receive an entire width or length of the portable electronic device;

a plurality of input controls positioned on the body outside of the recess such that the plurality of input controls may be actuated by a user while playing a game with the portable electronic device inserted in the recess;

first circuitry to communicate information relating to manipulation of the plurality of input controls to the portable electronic device;

second circuitry configured to authenticate the game accessory with the portable electronic device;

a connector insert to mate to a connector receptacle located on the portable electronic device, the connector insert and the connector receptacle forming a path for the communication; and a battery configured to provide power to both the game accessory and the portable electronic device, wherein the portable electronic device includes a screen, wherein the game provides a graphics image on the screen, wherein the game runs on a processor located on the portable electronic device.

2. The game accessory of claim 1 wherein the portable electronic device is a portable media player.

3. The game accessory of claim 1 wherein the input controls further comprise:

a control button that may be manipulated by the user to provide an input to the game; and a directional input control that may be manipulated by the user to provide directional input data to the game.

4. The game accessory of claim 1 further comprising:
one or more clips for physically restraining the portable electronic device in the game accessory.

5. The game accessory of claim 1 wherein the recess is configured to physically receive the portable electronic device such that a top side of the portable electronic device is parallel with a top side of the game accessory.

6. The game accessory of claim 1 further comprising:
a cover for securing the portable electronic device in the game accessory.

7. The game accessory of claim 1 wherein the game accessory is a steering wheel.

8. The game accessory of claim 1 further comprising third circuitry configured to provide identification information to the portable electronic device, the identification information including one or more capabilities of the game accessory.

9. The game accessory of claim 1 wherein the plurality of input controls includes an alphanumeric input device.

10. The game accessory of claim 1 further comprising an accelerometer for providing an input to the game based at least in part on the accelerometer sensing movement of the game accessory.

11. The game accessory of claim 1 further comprising third circuitry to retain information about the game after the portable electronic device is removed.

12. The game accessory of claim 11 wherein the information about the game comprises a score.

13. The game accessory of claim 11 wherein the third circuitry comprises a non-volatile memory.

* * * * *